United States Patent [19]

Reynolds

[11] Patent Number: 4,919,461
[45] Date of Patent: Apr. 24, 1990

[54] PRESSURE CYLINDER PIPE COUPLING

[75] Inventor: Desmond H. J. Reynolds, West Midlands, England

[73] Assignee: Lucas Industries Public Limited Company, Birmingham, England

[21] Appl. No.: 76,280

[22] Filed: Jul. 22, 1987

[30] Foreign Application Priority Data

Jul. 25, 1986 [GB] United Kingdom ............... 8618235

[51] Int. Cl.⁵ ........................................... F16L 55/00
[52] U.S. Cl. .................................... 285/174; 285/158; 285/330; 285/356; 285/906; 156/73.1
[58] Field of Search ............... 285/330, 174, 158, 423, 285/356, 397, 406; 156/73.1, 73.2

[56] References Cited

U.S. PATENT DOCUMENTS

| | | | |
|---|---|---|---|
| 2,570,477 | 10/1951 | Paquin | 285/174 |
| 2,776,151 | 1/1957 | Harkenrider | 285/174 |
| 3,702,707 | 11/1972 | Rosun | 285/92 X |
| 4,126,338 | 11/1978 | Coel et al. | 285/330 |
| 4,674,775 | 6/1987 | Tajima et al. | 285/330 |
| 4,714,278 | 12/1987 | Gassmunn | 285/33 X |

FOREIGN PATENT DOCUMENTS

| | | | |
|---|---|---|---|
| 2817438 | 10/1974 | Fed. Rep. of Germany | 285/356 |
| 1453190 | 10/1976 | United Kingdom | 285/174 |

*Primary Examiner*—Dave W. Arola
*Attorney, Agent, or Firm*—Fleit, Jacobson, Cohn, Price, Holman & Stern

[57] ABSTRACT

A pressure cylinder, such as a master cylinder or wheel cylinder for an hydraulic vehicle braking system has a plastic molded body within which a threaded insert is engaged and restrained rotationally and axially. A seal is positioned within the body between surfaces of the insert and body. The insert provides a seat against which is clamped, in use, a corresponding seat on a flared end of a pipe, the letter being retained within the body by a pipe nut threadedly engaged with the insert. Long-term thread torque and clamping force are sustained by the insert rather than by the plastic body which can be subject to "creep".

15 Claims, 2 Drawing Sheets

PRESSURE CYLINDER PIPE COUPLING

BACKGROUND OF THE INVENTION

1. Field of the Invention

This invention relates to a pressure cylinder of plastics material, such as a master cylinder or wheel cylinder for use in a vehicle hydraulic braking system for example, and is particularly concerned with the connection of a pressure fluid supply pipe to a port of such a cylinder.

2. Description of the Prior Art

Cylinders of plastics material are not capable of withstanding the stresses imposed by the conventional arrangement employed in metal pressure cylinders in which a pipe nut is engaged in a threaded aperture formed in the cylinder body and tightened to clamp a flared portion of a supply pipe against a seat in the body. Attempts have been made to adapt this conventional arrangement for use with plastic pressure cylinders. In one such adaptation, a separate threaded component is inserted into a guide formation in the plastic cylinder body and receives a pipe nut which clamps a flared pipe end against a seat formed in the body. Although the inserted component sustains the torque arising at the threaded connection between the pipe nut and component, the cylinder body is still required to sustain the high clamp loading at the pipe flare seat. This can be unsatisfactory in practice because of the long term tendency of plastics materials to "creep" away from highly stressed areas, which can give rise to the pipe nut becoming loose with the consequent risk of fluid leakage.

In another adaptation of the conventional pipe nut arrangement, a separate seat member is used in addition to a threaded component, the flared pipe end being clamped against the seat member by a pipe nut screwed into the threaded component, as before. This arrangement exhibits the disadvantage that the separate seat member may be lost in transit or inadvertently omitted during assembly, or when the pipe connection is made, and this can have potentially dangerous consequences in an hydraulic system used for vehicle brake actuation, for example.

BRIEF SUMMARY OF THE INVENTION

An object of the invention is to facilitate the connection of a hydraulic supply pipe to a pressure cylinder of plastics material while avoiding the disadvantages referred to above. A further object is to provide a method of making an hydraulic pressure cylinder of plastics material which is suitable for forming such a connection.

According to the invention, a pressure cylinder comprises a body molded from plastics material, a unitary insert engaged within the formed body and restrained to preclude rotational and axial movement thereof, and a seal positioned within the body between surfaces of the inset and body, the insert providing an integral seat against which is clamped, in use, a corresponding seat on a pipe retained within the body by retention means co-operating with the insert.

This arrangement enables both the long term torque in the screw threads and the clamping force at the seat to be sustained entirely by the insert without the use of additional components, the plastic body merely serving to provide the required axial and rotational restraint and being subjected only to short term forces such as those arising from tightening the pipe nut upon assembly, or hydraulic pressure force acting on the insert, in use.

Preferably, the body is formed with a socket of generally circular form to receive the insert, internal formations of the socket co-operating with formations on the insert to restrain relative rotation between the body and insert.

In one convenient arrangement, the insert provides a formation with an axially outwardly facing surface engaged by an opposed corresponding surface on the body to provide axial restraint of the insert.

In an alternative arrangement, the socket may be of non-circular form to receive the insert in non-rotatable manner, the body providing an axially inwardly facing surface for engagement by an opposed corresponding surface on the insert for axial restraint of the insert.

In a further alternative arrangement, the insert may be retained axially by a separate retention member disposed within an open end portion of the socket. When such a retention member is used, it may conveniently also co-operate with the insert so as to restrain the latter rotationally relative to the body.

From another aspect of the invention, a method of making a pressure cylinder comprises molding from plastics material a body having a cylindrical pressure receiving chamber therein, a fluid port in communication with said chamber and a socket in communication with the port, placing within the socket a unitary insert having an integral seat for engagement by a corresponding seat on a pipe to be connected to the cylinder, providing a sealing element between surfaces of the insert and body, and locking the insert axially and rotationally relative to the body.

In one convenient form of the method, said sealing element is a separate resilient ring assembled on and carried by the insert prior to insertion of the insert within the socket. Alternatively, the sealing element may be housed within the socket prior to insertion of the insert therein.

BRIEF DESCRIPTION OF THE DRAWINGS

The invention will now be described, by way of example, with reference to the accompanying drawings in which.

DETAILED DESCRIPTION

Figure 1:
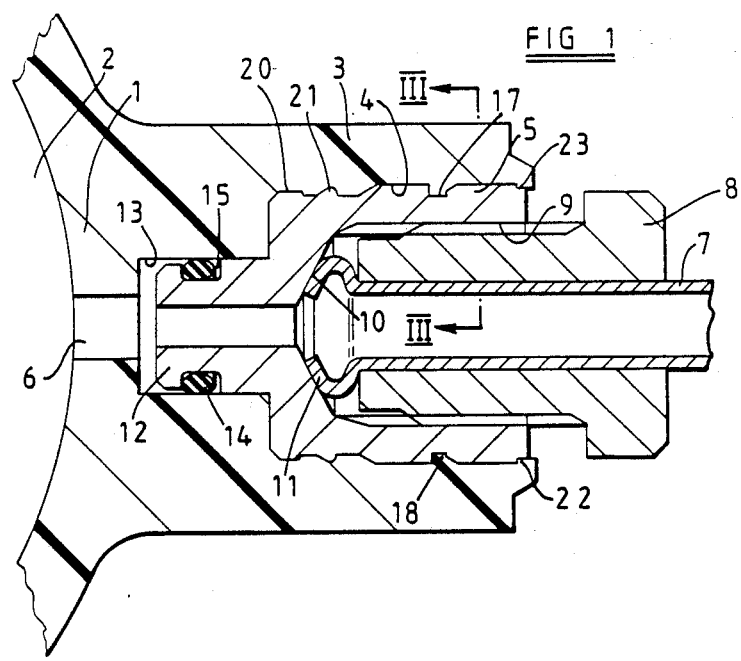
FIG. 1 is a transverse cross-sectional view through part of one form of the pressure cylinder of the invention.

Referring to the drawings, the pressure cylinder partly illustrated therein has a body 1 formed of plastics material and containing a cylindrical pressure chamber 2 which, in use, receives a slidable piston (not shown) for pressurizing fluid contained within the chamber, in conventional manner. The body is provided with a boss 3 within which is formed a generally cylindrical recess 4 containing an insert 5 of relatively tough material such as metal. The recess 4 communicates with the cylinder 2 via a passage 6 and the insert 5 serves for the connection to the body of a hydraulic fluid supply pipe 7 by means of a conventional pipe nut 8 screwed into a threaded bore 9 of the insert. The insert contains a conical seat 10 engaged, in use, by a conventionally flared pipe end 11, the latter being urged against the seat 10 by screwing the pipe nut 8 into the insert. The insert 5 has a concentric projecting hollow spigot 12 closely received within a relatively small diameter bore portion 13 of the body and a resilient sealing element 14, illustrated as an O-ring, surrounds the spigot 12 within a peripheral groove 15 thereof and engages an adjacent wall of the recess 13. The seal 14 acts to prevent fluid leakage from the pressure cylinder 2 around the insert 5.

Figure 3:
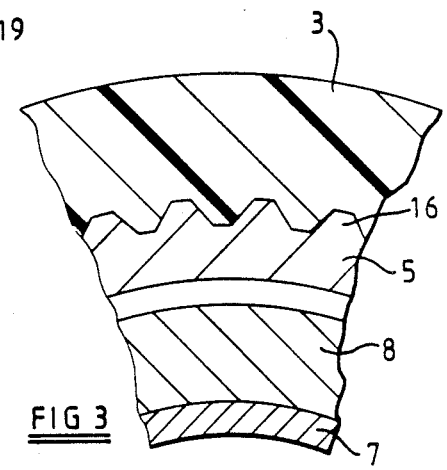
FIG. 3 is an enlarged cross-sectional view taken along the line III—III of FIG. 1.

Rotational restraint for the insert within the body is provided by a series of longitudinal flutes 16 on the insert, the sides of which flutes are engaged by the material of the body to effect rotational keying, as can be seen from FIG. 3. The flutes 16 are divided longitudinally by a circumferential groove 17 in which an annular portion 18 of the body material engages to provide axial restraint of the insert within the body. Between the spigot 12 and flutes 16 is a cylindrical portion 19 which terminates, at its free end, in a larger diameter shoulder 20 and carries a projecting rib 21, the latter providing further axial keying of the insert within the body.

Figure 2:
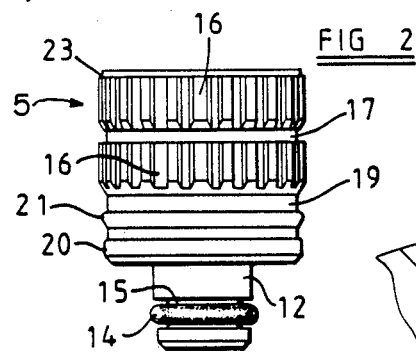
FIG. 2 is a side elevational view of a component of the cylinder of FIG. 1.

The pressure cylinder of FIGS. 1 to 3 is made by molding the pressure cylinder 1 from plastics material, as by an injection molding technique for example. The molded body is formed with the cylindrical recess 4 of which the diameter is slightly smaller than the maximum external diameter of the insert 5. The seal 14 is placed in the groove 15 and the insert placed against the mouth of the recess with the spigot extending within the recess.

The insert and/or molded body is then subjected to a suitable conventional sonic or ultra-sonic vibration technique while the two components are urged together axially, the vibration causing displacement of the body material so as to permit entry of the insert into the recess and keying of the body material with the flutes 16 and groove 17 to lock the insert to the body both rotationally and axially. A portion 22 of the body material also lodges against an axially facing shoulder 23 formed near the outer end of the insert. The pipe 7 may subsequently be fitted using the pipe nut 8 in the manner described above.

Figure 4:
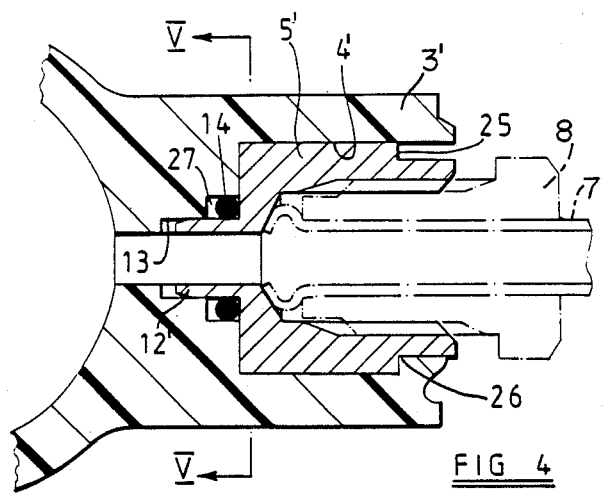
FIG. 4 is a view similar to FIG. 1 illustrating an alternative embodiment of the pressure cylinder of the invention.
Figure 5:
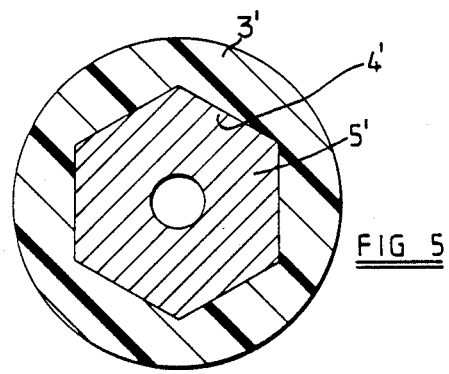
FIG. 5 is a cross-sectional view taken along line V—V of FIG. 4.

FIGS. 4 and 5 illustrate an alternative embodiment of the invention which is generally similar to that of FIGS. 1 to 3 except that the socket or recess 4' is of non-circular form, being of hexagonal section in the example illustrated, and the insert 5' is of complementary cross-section so that interengagement of the two components will preclude relative rotation thereof. Restraint against relative axial movement is achieved by providing an outwardly facing shoulder 25 adjacent the outer end of the insert and deforming the molded body, as for example by the application of heat or sonic vibration thereto, to displace a portion 26 of the latter into engagement with the shoulder. FIG. 4 illustrates, in the upper portion thereof, the insert housed within the recess prior to the aforesaid deformation and, in the lower part thereof, the assembled components after such deformation has been effected. In this embodiment, the resilient seal 14 again surrounds a spigot 12' of the insert. However, the spigot 12' now has a plain outer cylindrical surface and the seal is housed within a recess 27 formed by a local widening of the bore 13 within which the spigot 12' is received.

Figure 6:
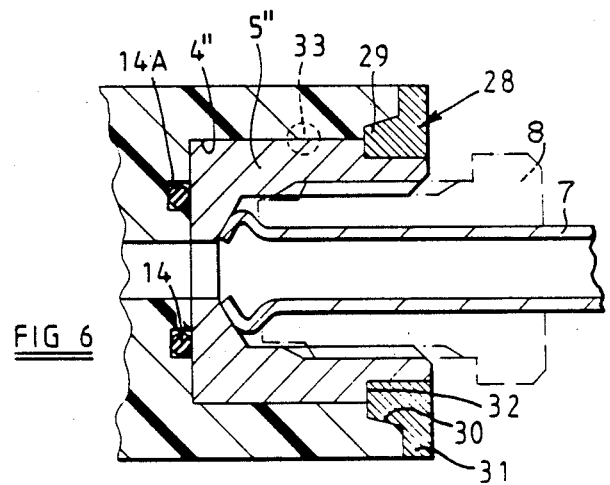
FIG. 6 is a view similar to FIG. 1 illustrating a further alternative embodiment of the cylinder of the invention.

A further alternative embodiment is illustrated in FIG. 6 and differs from the previous ones principally in that axial restraint of the insert 5" is provided by an end member 28 which has frusto-conical portion 29 housed within a complementary end portion 30 of the bore 4" and a generally radial flange 31 engaging an outer end surface of the molded body. The insert 5" is formed with a shoulder 32 against which the inner end of the member 28 engages to prevent relative axial movement between the insert and body. Rotational restraint for the insert relative to the body may be achieved in any convenient manner, such as the provision of a non-circular socket 4" within the body and complementary or other appropriate shaping of the outer surface of the insert. Alternatively, or in addition, the end member 28 may provide rotational restraint between the insert and body by providing appropriate keying formations between the external surface of the insert and the mating internal surface of the molded body and between the internal surface of the end member 28 and the mating external surface of the insert.

The end member 28 may be of any convenient material such as metal or plastics material and may be secured in position by any technique appropriate to the material employed, such as adhesion or bonding in the case of a metal member and heating or sonic technique in the case of a member made from plastics material. In the present embodiment, the seal 14 is housed within a groove 14A formed in the base of the socket 4", the seal being engaged by the facing end of the insert 5" and compressed thereby to the extent necessary to provide an adequate seal.

In any embodiment of the invention, separate mechanical means may be used to effect or supplement axial and/or rotational restraint between the insert and body. One example of such means is a pin 33, shown in FIG. 6 only, housed in facing half grooves formed respectively in the insert and molded body. In the embodiment of FIG. 6, axial retention of the end member 28 may be effected or enhanced by, for example, an external skirt or arms (not shown) extending longitudinally of the body into engagement with retention formations formed in the body external surface.

In the arrangements described, after the initial tightening of the nut 8, both the long-term torque between the nut and insert and the clamping force applied to the seat 10 are sustained by the insert and the problems relating to conventional arrangements discussed herein are thereby overcome. The invention will be seen to provide a simple and effective means of forming a pipe coupling on a pressure cylinder. The assembly of the insert after molding of the cylinder body has been completed simplifies the molding procedures required and reduces the time required for molding. This technique also enables the insert to be fitted in a controlled manner and tested during assembly and the presence and effectiveness of the seal 14 can also be checked at the assembly stage, following which there is no possibility of the seal being removed or displaced prior to installation of the cylinder in its location of use, as for example on a vehicle.

I claim:
1. A method of making a pressure cylinder having a body of plastics material, a cylindrical pressure-receiving chamber in the body, a fluid port in the body in communication with the chamber and a socket in the body in communication with the port and having an internal seal engaging surface comprising:

providing a one-piece unitary insert having an integral seat for engagement by a corresponding seat on a pipe to be connected to the cylinder;

providing an external dimension on at least a part of said insert slightly larger than at least a cooperating part of said socket;

providing external locking formations on at least said part of said insert having said larger external dimension for preventing movement of said insert relative to said body;

placing an annular sealing element on said insert;

inserting said insert within the socket by urging said body and insert together axially and simultaneously applying sonic vibration to at least one of said body and insert in order to cause entry of said insert into the socket, with the seal engaging around the internal seal engaging surface of the socket, and deformation of body material into said locking formations for locking said insert axially and rotationally relative to the body.

2. The method as claimed in claim 1 wherein the providing of external locking formations comprises:

providing a plurality of circumferentially spaced axially extending grooves in two axially spaced groups on said at least said part of said insert;

providing a circumferential groove on said insert between said two groups of axially extending grooves; and providing a side face on said circumferential groove for cooperating with deformed body material to axially restrain said insert in the body.

3. The method as claimed in claim 1 and further comprising:

providing an axially extending reduced diameter bore in said body as a part of said socket constituting said internal seal engaging surface;

providing a corresponding axially extending reduced diameter spigot on the inserted end of said insert closely receivable in said reduced diameter bore; and placing said annular sealing element on said spigot prior to said inserting step.

4. The method as claimed in claim 3 and further comprising:

providing an external peripheral groove in said spigot for receiving said annular sealing element.

5. The method as claimed in claim 3 and further comprising:

providing a bore through said spigot communicating with said reduced diameter bore.

6. The method as claimed in claim 5 and further comprising:

providing an external peripheral groove in said spigot for receiving said annular sealing element.

7. A method as claimed in claim 6 wherein: said insert is formed of metal.

8. A method as claimed in claim 6 and further comprising: molding said body from plastics material.

9. A method as claimed in claim 1 wherein: said insert is formed of metal.

10. A method as claimed in claim 1 and further comprising: molding said body from plastics material.

11. A method as claimed in claim 10 wherein:
said insert is formed of metal.

12. A method as claimed in claim 11 and further comprising:

forming said body with said socket as a cylindrical recess; and forming said insert with a cylindrical shape having a maximum external diameter slightly larger than the diameter of said cylindrical recess.

13. A method as claimed in claim 1 and further comprising:

forming said body with said socket as a cylindrical recess; and forming said insert with a cylindrical shape having a maximum external diameter slightly larger than the diameter of said cylindrical recess.

14. A pressure cylinder comprising:

a body molded from plastics material;

a cylindrical pressure-receiving chamber in said body;

a fluid port in said body communicating with said chamber;

a socket bore in said body communicating with said port and having an internal seal engaging surface;

a unitary one-piece insert in said socket;

an integral seat on said insert for engagement with a corresponding seat on a pipe to be connected to said cylinder;

external locking formations on said insert;

internal locking formations in said socket cooperating with said external locking formations for retaining said insert against rotational and axial movement relative to said body;

an annular sealing element on said insert engaging around said internal seal engaging surface of said socket;

made by the method comprising providing an external dimension on at least a part of said insert slightly larger than at least a cooperating part of said socket prior to inserting said insert in said socket, providing said external locking formations on at least said part of said insert having said larger external dimension, and inserting said insert within said socket by urging said body and insert together axially and simultaneously applying ultrasonic vibration to at least one of said body and insert to cause entry of said insert into said socket, with the seal engaging around the internal seal engaging surface of the socket, and deformation of material of said body into said locking formations on said insert to produce said internal locking formations in said socket for locking said insert axially and rotationally relative to said body.

15. A method as claimed in claim 14 wherein:
said insert is formed of metal.

* * * * *